Feb. 13, 1940. J. CRAPEZ 2,189,857
PSYCHROMETRIC APPARATUS FOR DIRECT READING OF HUMIDITY
Filed July 8, 1937
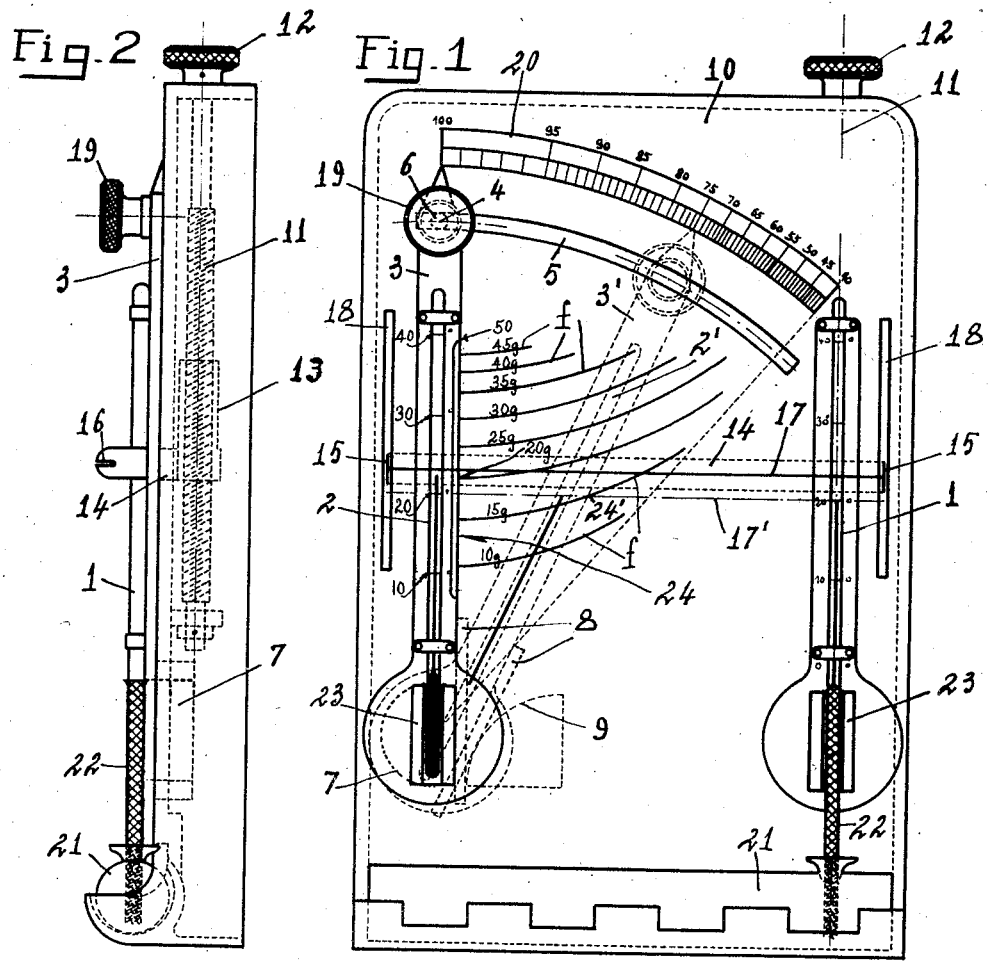
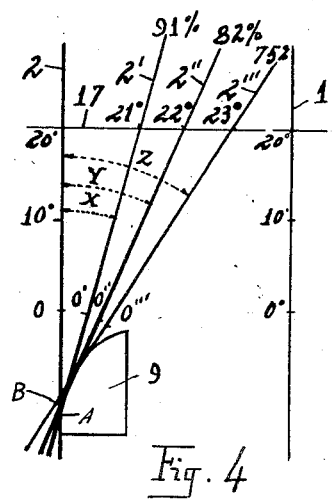
INVENTOR
JULES CRAPEZ
BY
Richards & Geier
ATTORNEYS Patented Feb. 13, 1940

2,189,857

UNITED STATES PATENT OFFICE 2,189,857

PSYCHROMETRIC APPARATUS FOR DIRECT READING OF HUMIDITY

Jules Crapez, Mons-en-Baroeul, France

Application July 8, 1937, Serial No. 152,570
In France November 5, 1936

3 Claims. (Cl. 73—338)

The object of the present invention is a psychromatic apparatus, capable of indicating the hygrometric state of the air in a room or any premises without possible error due to reading graduated scales of two thermometers, a dry and a wet thermometer, by effecting under determined conditions, a simple relative movement of one of the thermometers.

The object of the invention is to facilitate the rapid direct reading of the hygrometric state of the air, arising or not from moistening of the air, of any industrial or private premises by aligning the levels of the thermo-metric columns of the two thermometers, the wet and dry thermometers, forming a psychrometer.

It is known that there exist different methods for measuring the hygrometric state of the air, and a certain number of more or less perfected apparatus for determining the hygrometric state, of which among others the apparatus termed a "psychrometer", comprises two thermometers, one of which has its bulb surrounded by muslin which is constantly moistened.

Various tables give the hygrometric state of the air as a function of the temperature indicated on the wet thermometer and the differences of the two temperatures indicated by the dry thermometer and the wet thermometer.

Devices have been investigated in order to give the value of the hygrometric state without having to determine these differences, but these render it necessary to read other numbers and then to memorize them in order to correlate the readings of thermometers on graduated scales or charts.

Other devices avoid these errors due to reading or memorizing, but they necessitate a judicious selection among numerous curves or the use of mechanical combinations which are sometimes complicated and not free from errors.

It is in order to overcome the difficulties and tedious operations necessitated by the apparatus hitherto used that it has been sought to obtain the psychrometer device which will be described hereunder, and which device responds entirely to the purpose envisaged, its special construction avoiding practically any error due to reading or memorizing indications of thermometric scales, while eliminating in an absolute manner the errors arising due to the adjustment of the apparatus in order to determine the hygrometric state investigated due to a particular conception of the application of relative mobility of one of the two thermometers.

It has been established that by arranging tables of readings of a psychrometer, in graphic form, the values of the wet thermometer plotted as ordinates and the differences between the values of the two thermometers, the wet and dry thermometers, as abscissae, all the values of the same hygrometric state are substantially in alignment and that this alignment is fairly exact for temperatures from 10 to 35 degrees centrigrade, which is generally sufficient for the requirements of industry.

For this reason the apparatus envisaged is based on a method of displacing the dry thermometer in order to suitably bring the height of its thermometric column on a horizontal line passing through the height of the thermometric column of the wet thermometer. This movement is effected in such a manner that the angle formed with the original position of this thermometer represents the hygrometric state indicated in tables by virtue of the temperatures read on the dry thermometer and the wet thermometer.

This result is obtained in practice by forming the dry thermometer rigid with a pointer, the upper end of which moves in a groove and the lower end of which slides on a cam having a profile corresponding to the trace of this groove, that is to say this profile is such that for any displacement of the pointer, the point of intersection of the axis of the dry thermometer with the axis of the same dry thermometer in its initial position is always equidistant from an assumed zero curve.

Thus each angle formed for any displacement of the dry thermometer in order to bring the level of its thermometric column on the horizontal line through the level of the thermometric column of the wet thermometer, will correspond exactly to the hygrometric state indicated on a dial placed above the guide slot and the graduations of which will correspond to the numbers given in the tables used with the ordinary psychrometer.

The invention according to the invention is represented by way of example in the accompanying drawing in which:

Figure 1 represents a view in elevation of the apparatus showing the position of the pointer carrying the dry thermometer for a reading of the hygrometric state corresponding to the temperatures indicated by the dry thermometer and the wet thermometer;

Figure 2 is a profile view showing the mechanism for adjusting the horizontal movable wire;

Figure 3 is a partial view in plan;

Figure 4 is a diagrammatic view of the displacement of the dry thermometer with respect to its initial position in order to determine the profile of the cam and the trace of the guide slot.

Referring to the drawing it will be seen that the wet thermometer 1 is in a fixed position while the dry thermometer 2 is mounted on a movable pointer 3. This pointer carries a lug or slide block 4 sliding in a guide slot 5 the trace of which is such that concurrently with the displacement of the lower end of the pointer, the point of intersection of the axis of the dry thermometer 2 with the axis of its original position is equidistant from the zero curve; for example, in Figure 4, $OA=O'A$ and $OB=O''B$. A bolt 6 passing through the block 4 locks the pointer 3 at the desired position. A bracket 7 attached to the back part of the pointer 3 carries a guide strip 8 sliding on a cam 9 of given profile such that the intersection is obtained at the value desired for the alignment of hygrometric states of the same value.

The body of the apparatus is formed by a frame with a face 10 and behind this face is placed a screw 11 the rotation of which is controlled by a milled knob 12 which lifts or lowers a nut 13 integral with an arm 14 the ends 15 of which are bent at right-angles and provided with notches 16 and move in guide slots 18 of the face 10.

The notches 16 of the ends 15 serve to stretch and to hold in place a horizontal wire 17 which follows the ascending and descending motion of the arm 14 and thus remains horizontal.

The wire 17 is first aligned with the end of the thermometric column of the wet thermometer 1 by operating on 12, and then the pointer 3 carrying the dry thermometer 2 is moved by loosening the milled button 19 until the end of the thermometric column of this thermometer comes opposite the wire 17. The reading of the hygrometric state is then effected on the dial 20 graduated as above mentioned and placed above the guide slot 5 on the path of the end of the pointer.

In the lower part of the apparatus is arranged a container 21 containing water which constantly supplies the covering or fabric 22 surrounding the bulb of the wet thermometer. The thermometers 1 and 2 are arranged on the front of the apparatus, the thermometer 1 being on the pointer, in order to be in front of the openings 23, which permits their natural or artificial ventilation.

It will be understood that it being no longer necessary to read the temperatures indicated by the two thermometers 1 and 2 since only the heights of the thermometric columns are considered, and since it is no longer necessary to interpret the interval between their readings there can no longer be any possibility of error and thus the desired hygrometric state is obtained rigorously and exactly.

It will be noted that since the horizontal wire is in alinement with the levels of the indicating columns of the two thermometers in order to effect a measurement of the hygrometric state, modifications of the hygrometric state arising subsequently can be rapidly determined.

Furthermore, it will be noted that to each point of intersection of the dry thermometer with the movable horizontal wire representative of the temperatures of the wet thermometer, there corresponds a known hygrometric state. It will thus be easy to indicate at this point the weight in grams of water vapour contained in a cubic meter of air at the temperature and at the hygrometric state considered.

These data may be arranged in the form of curves $f$, shown in Figure 1, and the reading may be effected by means of a wire 24 extending along the pointer 3 and movable therewith, the point of intersection of the wire 24 with the wire 17 representing a point lying upon one of the curves $f$.

Figure 4 shows diagrammatically how the dry thermometer moves so that the pointer on which it is placed indicates on the divided scale the percentage of humidity of the air.

The angles $x$, $y$, $z$, etc. formed by the intersecting axes 2 and 2', 2 and 2'', 2 and 2''', are representative of the hygrometric states indicated in the tables and resulting from the alignment considered, for example:

| Temperature of wet thermometer | Temperature of dry thermometer | Difference | Hygrometric state |
|---|---|---|---|
| *Degrees* | *Degrees* | | *Percent* |
| 20 | 21 | 1 | 91 |
| 20 | 22 | 2 | 82 |
| 20 | 23 | 3 | 75 |

It will be seen that it is easy to determine the profile of the cam 9 as well as the path of the guide slot guiding the upper hand of the pointer.

Suppose that it is necessary to know the hygrometric state corresponding to the temperatures indicated by the thermometric levels of the two thermometers, the wet thermometer 1 indicating 20°, the dry thermometer 2 indicating 23°. It is sufficient to operate the knob 12 so as to lower the horizontal wire 17 to a position indicated by the numeral 17' in order to bring it to the level of the thermometric column of 1 indicating 20°. When this operation has been effected the milled knob 19 is loosened and the pointer is caused to take up position 3' such that the level of the thermometric column of thermometer 2 which moves to 2' may be opposite 17'. The pointer then being fixed in position by means of the knob 19 the number 75 on the dial 20 can be read opposite the hand of the pointer which indicates that the hygrometric state investigated is 75%.

In order to obtain at the same time the weight in grams of water vapour contained in a cubic meter of air at the temperature corresponding to this hygrometric state reference is made to the curves $f$ and that curve is noted which passes through the point of intersection of the wire 17 in its position indicated by the numeral 17' and the wire 24 in the position indicated by the numeral 24', viz. in this case the 15 gram curve, showing that the required result is 15 grams.

I claim:

1. A psychrometric apparatus for the direct reading of hygrometric conditions, said apparatus comprising a frame, an immovable wet bulb thermometer carried by said frame, means movably mounted upon said frame and extending across the dry bulb thermometer for indicating the level of mercury within said wet bulb thermometer, a dry bulb thermometer movably mounted in said frame, and means connected with said frame to move manually said dry bulb thermometer in relation to said wet bulb thermometer to cause the levels of the two thermometers to coincide and so that the angle between the original and final directions of the longitudinal axis of said dry bulb thermometer is representative of the hygrometric state as given by tables correlating the temperatures indicated by the two thermometers.

2. A psychrometric apparatus for the direct reading of hygrometric conditions, said apparatus comprising a frame having a guide slot formed therein, an immovable wet bulb thermometer carried by said frame, a pointer, a slide block connected with one end of said pointer and movable in said guide slot, a dry bulb thermometer carried by said pointer, a member connected with the opposite end of said pointer, a cam connected with said frame and having a surface over which said member slides, the shape of said surface of the cam being such that the point of intersection of the axis of the dry bulb thermometer in its displaced position with the axis of the dry bulb thermometer in its initial position is equidistant from a zero curve and that the angle between the original direction and the final direction of the longitudinal axis of the dry bulb thermometer resulting from bringing the level of mercury of the dry bulb thermometer to the level of mercury of the wet bulb thermometer is representative of the hygrometric state as given by tables correlating the temperatures indicated by the two thermometers, means movably mounted upon said frame and extending across the dry bulb thermometer for indicating the level of mercury within said wet bulb thermometer, and a scale carried by said frame above said guide slot and having graduations corresponding to values given by tables usually employed in connection with psychrometers.

3. A psychrometric apparatus for the direct reading of hygrometric conditions, said apparatus comprising a frame having a guide slot formed therein, an immovable wet bulb thermometer carried by said frame, a pointer, means connected with one end of said pointer and movable in said guide slot, a dry bulb thermometer carried by said pointer, a member connected with the opposite end of said pointer, means connected with said frame and having a surface which is in frictional engagement with said member, the shape of said surface being such that the point of intersection of the axis of the dry bulb thermometer in its displaced position with the axis of the dry bulb thermometer in its initial position is equidistant from a zero curve and that the angle between the original direction and the final direction of the longitudinal axis of the dry bulb thermometer resulting from bringing the level of mercury of the dry bulb thermometer to the level of mercury of the wet bulb thermometer is representative of the hygrometric state as given by tables correlating the temperatures indicated by the two thermometers, a horizontal wire extending across both thermometers movable over said frame to indicate the level of the mercury column of said wet bulb thermometer, said frame being provided with a plurality of curves representing the weight of water vapor in the air, a scale carried by said frame above said guide slot and having graduations corresponding to percentages of humidity in the air, and another wire carried by said pointer and extending parallel to the longitudinal axis of said dry bulb thermometer, the point of intersection of the two wires in the displaced position of the pointer indicating a weight of water vapor as represented by said curves.

JULES CRAPEZ.